United States Patent

McGhee

[11] Patent Number: 5,925,242
[45] Date of Patent: Jul. 20, 1999

[54] SAND TRAP AND FLOW CONTROLLER MECHANISM FOR A BATHTUB

[76] Inventor: John D. McGhee, 2414 Pine Crest La., Fredericksburg, Va. 22408

[21] Appl. No.: 08/936,556

[22] Filed: Sep. 24, 1997

[51] Int. Cl.[6] .............................. B01D 21/00; E03C 1/262
[52] U.S. Cl. ...................... 210/164; 210/305; 210/532.1; 4/681; 4/682; 4/689; 4/693
[58] Field of Search ..................................... 210/163, 164, 210/166, 532.1, 521, 305, 307; 4/679, 681, 682, 689, 693, 650

[56]  References Cited

U.S. PATENT DOCUMENTS

| | | |
|---|---|---|
| 417,441 | 12/1889 | Reader . |
| 1,025,584 | 5/1912 | Murphy ........................................ 4/693 |
| 1,070,778 | 8/1913 | Callahan . |
| 1,507,531 | 9/1924 | Vardell .................................... 210/164 |
| 1,713,300 | 5/1929 | Robertson .................................. 4/693 |
| 2,246,390 | 6/1941 | Smith ...................................... 210/164 |
| 2,497,577 | 2/1950 | Biggerstaff . |
| 2,550,400 | 4/1951 | Boosey . |
| 2,550,401 | 4/1951 | Boosey . |
| 3,042,210 | 7/1962 | Hattori .................................... 210/163 |
| 4,031,009 | 6/1977 | Hicks ...................................... 210/164 |
| 4,043,354 | 8/1977 | Brown ....................................... 4/679 |
| 4,045,346 | 8/1977 | Swanskey ................................. 210/164 |
| 5,062,735 | 11/1991 | Gardin .................................... 210/164 |
| 5,233,154 | 8/1993 | Horiai et al. . |
| 5,284,580 | 2/1994 | Shyh ...................................... 210/164 |
| 5,413,705 | 5/1995 | Tammera et al. ......................... 210/163 |
| 5,650,065 | 7/1997 | Sewell .................................... 210/166 |

FOREIGN PATENT DOCUMENTS 4269226  9/1992  Japan .

*Primary Examiner*—Christopher Upton
*Attorney, Agent, or Firm*—Diller, Ramik & Wight, PC

[57]  ABSTRACT

A sand trap and flow controller mechanism for a bathtub includes an outer housing defined by an externally threaded peripheral wall having an upper outwardly directed peripheral flange and a lower inwardly directed peripheral flange with a pair of diametrically opposite openings, an inner sand trap housing defined by an outer peripheral wall, an inner peripheral wall and an annular wall therebetween collectively defining a sand trap chamber, and a flow controller mechanism having diametrically oppositely directed wings which are received in channels for guiding a valve of the flow controller toward, in sealing engagement upon and away from an upper peripheral edge of the inner peripheral wall of the inner sand trap housing.

46 Claims, 2 Drawing Sheets

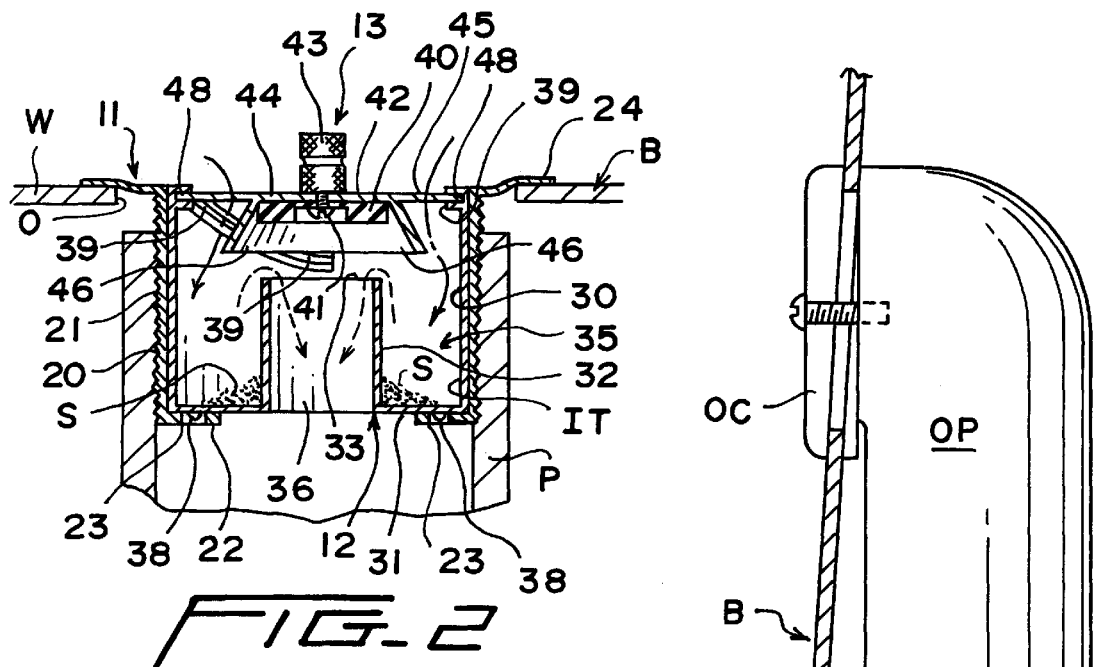
FIG_2
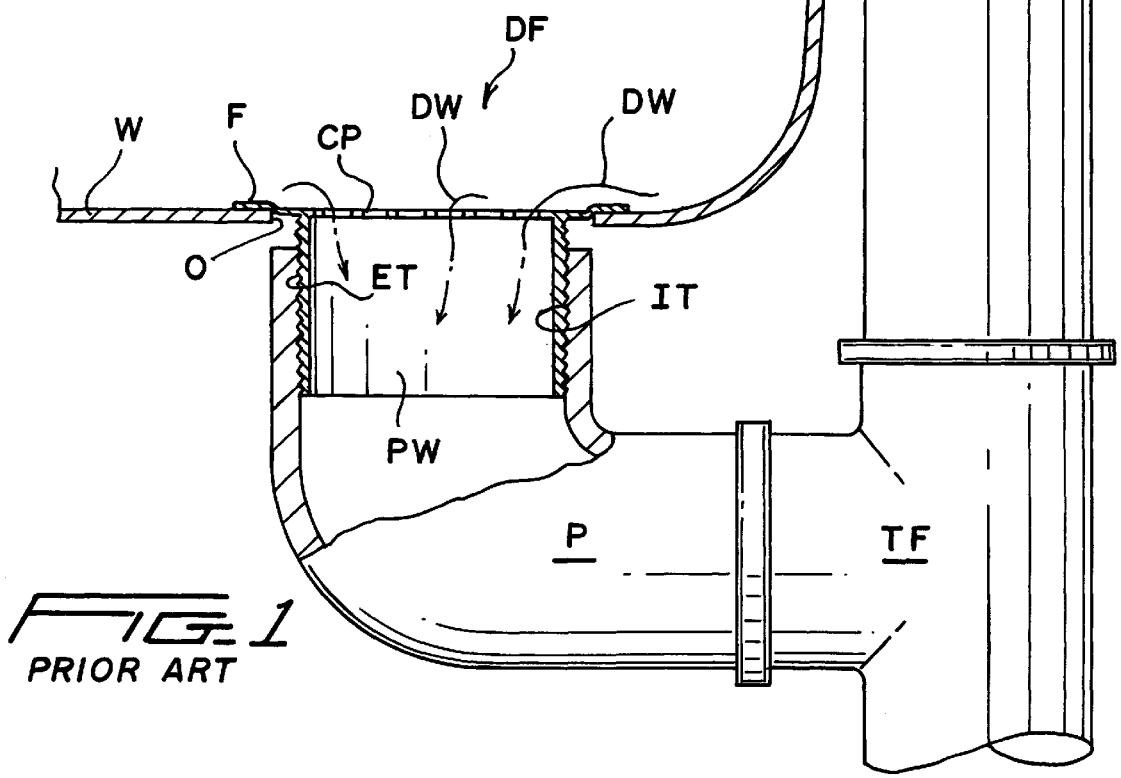
FIG_1
PRIOR ART

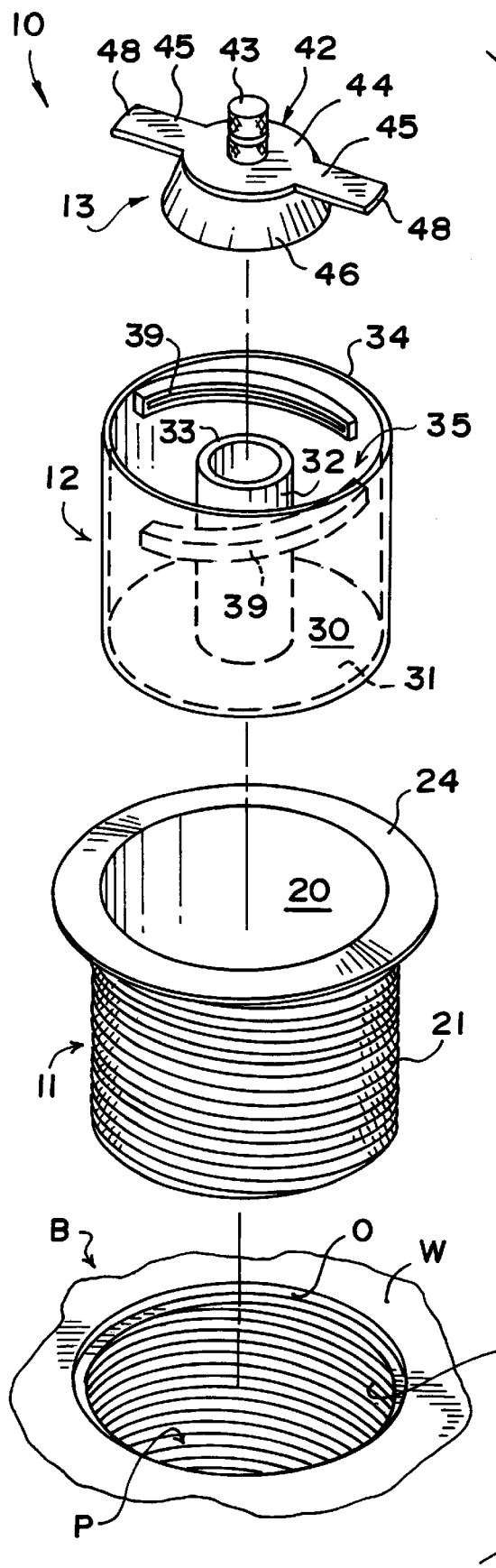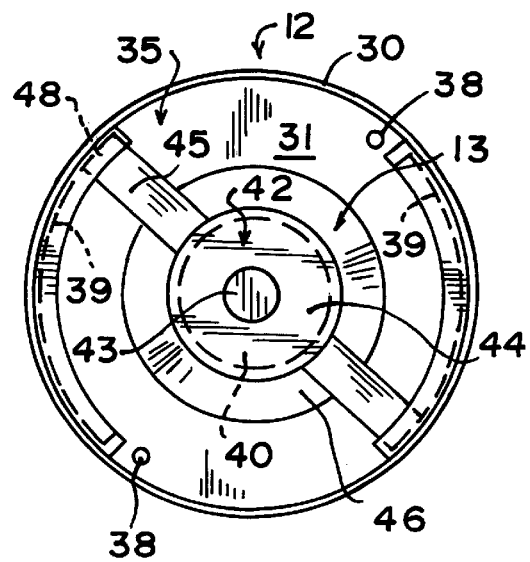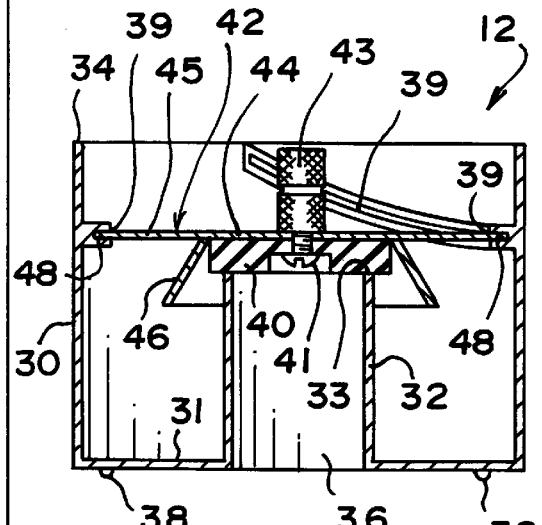

SAND TRAP AND FLOW CONTROLLER MECHANISM FOR A BATHTUB

BACKGROUND OF THE INVENTION

The outlet drains of bathtubs in beach homes, beach motels and/or beach hotels and the like tend to continually become clogged by sand when bathers fail to rinse their sandy feet/bodies and shower/bathe in tubs. Sand is washed from their bodies/feet, flows into and through the associated bathtub drain and accumulates in the bathtub outlet/trap resulting in slow drainage of water from the bathtub or total blockage thereof. It is not unusual, for example, to take a shower and stand in water accumulating in the bathtub because the flow from the shower head/outlet is faster than the outflow of the water from the bathtub drain. The adverse health problems are clearly apparent from such circumstances, not to mention the cost involved to have a plumber continuously and repetitiously clear such drains.

SUMMARY OF THE INVENTION

In keeping with the foregoing, a major object of the present invention is to provide a novel mechanism which preferably can be retro-fitted to a bathtub outlet for trapping sand, while at the same time providing a flow controller mechanism to regulate the flow of water through the bathtub outlet or completely cut-off the same.

In keeping with the foregoing, a novel sand trap and flow controller mechanism is provided in keeping with the present invention which includes an outer housing having an externally threaded peripheral wall, a lower annular shelf and a radially outwardly directed flange which can be threaded into the internally threaded outlet pipe of a conventional bathtub after, of course, the conventional flanged bathtub outlet has been removed therefrom.

An inner sand trap housing seats in the outer housing and is defined by an outer peripheral wall, an inner tubular peripheral wall and an annular wall therebetween. The latter three walls define a generally annular sand trap chamber into which sand flows and can accumulate while water can flow outwardly from the sand trap chamber over an uppermost peripheral edge of the inner tubular wall.

The sand trap and flow controller mechanism also includes a closure having a conical deflector which deflects water draining from the bathtub radially downwardly and outwardly so that sand entrained in the water will accumulate in the sand trap chamber and will not exit a discharge opening of the inner tubular wall.

In further keeping with the invention, the closure includes a pair of diametrically oppositely directed wings or lugs which each ride in a channel of the outer peripheral wall of the inner sand trap housing. As the closure is rotated, the wings or lugs ride in the channels upwardly or downwardly, depending upon the direction of rotation of the closure, and thus the rate of flow of water through the discharge opening can be regulated or completely stopped.

Accordingly, in keeping with the present invention sand is not only prevented from exiting into the outlet pipe or discharge pipe associated with conventional bathtubs, but the present sand trap and flow controller mechanism can be utilized either as original equipment or as a retro-fit mechanism. Moreover, the sand trap housing is readily removed by a direct upward pull and, thus, sand which has accumulated in the sand trap chamber can be quickly dumped, the sand trap chamber rinsed and the sand trap housing replaced for subsequent use in a very efficient and rapid manner.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a fragmentary side elevational view with portions thereof broken away and shown in cross section of a conventional bathtub installation, and illustrates a conventional bathtub, an overflow pipe, an internally threaded drain pipe, and a conventional flanged fitting having a flange seated upon an internal surface of the tub and an exteriorly threaded peripheral wall threaded into internal threads of the drain pipe.

FIG. 2 is a fragmentary cross-sectional view of a novel sand trap and flow controller mechanism of the present invention, and illustrates the mechanism retro-fit into the tub outlet of FIG. 1 after the conventional tub drain outlet has been removed and discarded.

FIG. 3 is an exploded view of the sand trap and flow controller mechanism of the present invention, and illustrates an outer housing defining an outer chamber having an externally threaded peripheral wall and a radially outwardly directed upper flange, an inner housing defining a sand trap chamber, and a closure/flow controller member.

FIG. 4 is an axial cross-sectional view taken through the sand trap housing, and illustrates the closure member rotated into its closed position with an elastomeric valve sealed against an uppermost peripheral edge of a discharge tube or wall of the sand trap housing.

FIG. 5 is a top plan view of the inner sand trap housing, and illustrates diametrically oppositely directed lugs or wings of the closure member received in helical channels of an outer peripheral wall of the sand trap housing.

DESCRIPTION OF THE PREFERRED EMBODIMENT

A conventional bathtub B is illustrated in FIG. 1 of the drawings and includes an opening O in a bottom wall W which is aligned with a drain pipe or outlet pipe P having internal threads IT. A conventional drain fitting DF is defined by a peripheral wall PW having external threads ET which are threaded into the internal threads IT of the drain pipe P. An integral apertured cover plate CP permits drain water DW to flow therethrough in a manner indicated by the unnumbered headed arrows of FIG. 1. An integral flange F seats over the outlet O to provide an aesthetic appearance to the interior (unnumbered) of the bathtub B. A conventional overflow cover C is conventionally connected to the bathtub B and to an overflow pipe OP which is in turn connected by a T-fitting TF to the drain pipe P. A drain trap (not shown) is, of course, conventionally associated with the drain pipe P and the overflow pipe OP and sand entrained in the water will over time accumulate in the drain trap eventually slowing the flow of water from the bathtub B or completely preventing the flow of water outwardly therefrom. As noted heretofore, cleaning/air-blasting sand from such traps is a costly proposition, particularly when done repetitiously, as is often the case at beach hotels, motels, and the like.

A novel sand trap and flow controller mechanism of the present invention is fully illustrated in FIGS. 2 through 5 of the drawings and is generally designated by the reference numeral 10.

The sand trap and flow controller mechanism 10 is adapted for retro-fit assembly to the tub outlet O once the conventional drain fitting DF has been removed, as illustrated in FIG. 2, although the sand trap and flow controller mechanism 10 can be installed as original equipment by bathtub manufacturers for installations susceptible to sand accumulation in outlet drains.

The sand trap and flow controller mechanism 10 includes an outer housing 11, and inner housing or inner sand trap housing 12 and a flow controller or flow controller means 13 for opening and closing water flow through the overall sand trap and flow controller mechanism 10.

The outer housing 11 of the sand trap and flow controller mechanism 10 includes an outer peripheral wall 20 (FIGS. 2 and 3) having an external thread 21 which matches the internal thread IT of the drain pipe P. A lower radially inwardly directed flange 22 of the outer housing 11 defines means for supporting the inner sand trap housing 12 thereupon in the manner best illustrated in FIG. 2 of the drawings. The annular radially inwardly directed lower flange 22 includes two diametrically opposite openings 23 (FIG. 2) therein which function in a manner to be described more fully hereinafter.

An upper radially outwardly directed flange 24 overlies the opening O of the bathtub B (FIG. 2) when the sand trap and flow controller mechanism 10 has been assembled relative to the bathtub wall W and the drain pipe P.

The inner sand trap housing 12 includes an outer peripheral or cylindrical wall 30, a lower annular wall 31 and a central cylindrical wall or tube 32 having an uppermost peripheral edge 33 which is axially below an uppermost peripheral edge 34 of the outer peripheral wall 30, as is most evident in FIG. 2 of the drawings. The walls 30, 31, 32 define an inner annular sand trap chamber 35 in which sand entrained in water enters during flow therein, as indicated by the dash-dot arrows of FIG. 2. The heavier sand particles S will, of course, sink to the bottom of the sand trap chamber 35, while water W alone will exit therefrom over the peripheral edge 33 of the inner peripheral wall 32 and outwardly of a discharge opening or discharge end portion 36 thereof, as indicated by the dashed arrows of FIG. 2.

The bottom or lower annular wall 31 includes two diametrically opposite downwardly directed detents or projections 38 (FIGS. 2 and 4) which in the assembled condition of the sand trap and flow controller mechanism 10 seat in the diametrically opposite openings 23 of the lower flange 22 of the outer housing 11. The interengagement between the detents 38 and the openings 23 prevents relative rotation between the housings 11, 12 upon rotation of the flow controller mechanism 13, as will be more apparent hereinafter.

The outer peripheral wall 30 of the sand trap housing 12 carries on its inner surface (unnumbered) two diametrically opposite helically/spirally disposed channels 39 which function to guide the axial movement of the flow controller 13 upwardly and downwardly relative to the peripheral edge 33 of the inner peripheral wall 32 of the sand trap housing 12 to open (FIG. 2) and close (FIG. 4) the flow of water relative to the discharge opening 36.

The flow controller mechanism 13 includes a circular elastomeric or similar material valve or gasket 40 secured by a screw 41 which passes through an opening (unnumbered) of a flow controller plate 42. The screw 41 is threaded into an internal thread (not shown) of a knurled knob 43. The flow controller plate 42 includes a circular central plate portion 44 which is slightly larger than the diameter of the gasket or valve 40, a pair of diametrically opposite radially outwardly directed wings or lugs 45 and a radially downwardly and outwardly directed frusto-conical plate 46 defining means for deflecting water and sand radially outwardly and downwardly into the sand trap chamber 35, as is indicated by the dot-dashed arrows of FIG. 2. The wings or lugs 45 have terminal edges 48 which define a distance slightly greater than the distance between the channels 39. Thus, the wings 45 can be deflected or bowed slightly to snap each into its associated channel 39 after which the natural resilience of the wings 46 return the same into a common plane, as is illustrated in FIG. 4 of the drawings. Thus, as the knob 43 is grasped and rotated in either direction, the wings 45 are guided along the channels 39 to raise and lower the flow controller 13 between the full closed position shown in FIG. 4, the full open position shown in FIG. 2, or positions therebetween. During rotation of the flow controller 13, the inner sand trap housing 12 will not rotate relative to the outer housing 11 because of the interengagement of the bosses or detents 38 and the openings 23 (FIG. 2). However, when sufficient sand S accumulates in the sand trap chamber 35, the sand can be emptied by simply grasping the knurled knob 43 and lifting the sand trap housing 12 axially upwardly which permits the total withdrawal thereof from the interior of the outer housing 11. The sand S can then simply be dumped from the sand trap chamber 35 by inverting the housing 11, rinsing out the same and reinserting the sand trap housing 12 into the outer housing 11. During cleaning of the sand S from the sand trap chamber 35, the flow controller 13 can, of course, be removed by simply snapping the wings 45 outwardly of the channels 39, flushing the sand chamber 35 to rid the same of the sand S and again reinserting the wings 46 into the channels 39 in the manner heretofore described.

As can be most readily visualized in FIG. 2, all the sand S accumulated in the sand trap 35 of the sand trap and flow controller mechanism 10 will not flow into the outlet pipe or drain pipe P and, obviously, will not accumulate therein or in the associated trap (not shown). Whether as original equipment or as a retro-fit assembly, the sand trap and flow controller mechanism 10 prevents the adverse accumulation of sand associated with bathtub drains and automatically prevents health-associated problems and the costs involved in plumbing maintenance and/or repair.

All of the components of the sand trap and flow controller mechanism are made of quality materials, such as brass, except for the gasket 40, or equivalent polymeric/copolymeric material which is not adversely effected by water and will not or will not readily rust or deteriorate. The outer housing 11 is preferably made from brass or the flange 24 can be chromed to achieve an aesthetic appearance while the sand trap housing 12 can be formed from polymeric/copolymeric plastic material of relatively high strength and low wear. Except for the elastomeric or equivalent gasket 40, the flow controller 13 should match the flange 24 (brass or chrome, for example, for aesthetic purposes).

It is also indicated that the bathtub B of FIG. 1 has been illustrated rather simplistically, and the same could include a conventional flow controller, either manually operated directly in the area of the drain fitting DF or provided with an operative lever in the area of the overflow coupling C, as is conventional. However, the latter components can be removed and discarded when replaced by the retro-fitted sand trap and flow controller mechanism 10 of the present invention.

Although a preferred embodiment of the invention has been specifically illustrated and described herein, it is to be understood that minor variations may be made in the apparatus without departing from the spirit and scope of the invention, as defined the appended claims.

I claim:

1. A sand trap and flow controller mechanism comprising an outer housing defining an outer chamber, means for securing said outer housing relative to a tub outlet drain pipe; an inner sand trap housing defined by an outer peripheral wall, an inner peripheral wall spaced from said outer peripheral wall and an annular bottom wall between said inner peripheral wall and said outer peripheral wall; said walls collectively defining an inner sand trap chamber, said inner peripheral wall having an upper peripheral edge and a lower water discharge opening, said inner sand trap housing being located in said outer chamber whereby water entrained sand is adapted to flow from an associated tub into said inner sand trap chamber, flow controller means for opening and closing water flow through said inner sand trap chamber over said upper peripheral edge whereby sand is retained in said inner sand trap chamber and water flows outwardly along said inner peripheral wall through said lower water discharge opening, and deflecting means for deflecting water flow radially outwardly beyond said upper peripheral edge.

2. The sand trap and flow controller mechanism as defined in claim 1 wherein said flow controller means includes a valve body which seats upon said upper peripheral edge to prevent water flow through said lower water discharge opening.

3. The sand trap and flow controller mechanism as defined in claim 2 wherein said securing means is an external thread of said outer housing.

4. The sand trap and flow controller mechanism as defined in claim 3 including means for preventing relative rotation between said outer housing and said inner sand trap housing.

5. The sand trap and flow controller mechanism as defined in claim 3 wherein said deflecting means further deflects water axially downwardly into said inner sand trap chamber.

6. The sand trap and flow controller mechanism as defined in claim 3 wherein said flow controller means includes a valve body having an axis substantially coincident to an axis of said inner peripheral wall, and said valve body is movable toward and away from said upper peripheral edge.

7. The sand trap and flow controller mechanism as defined in claim 3 including means for rotatably guiding the movement of said flow controller means toward and away from said upper peripheral edge, said rotatably guiding means includes a guide member and a guide follower, one of said guide member and guide follower being defined by said outer housing, and another of said guide member and guide follower being defined by said flow controller means.

8. The sand trap and flow controller mechanism as defined in claim 2 including means for preventing relative rotation between said outer housing and said inner sand trap housing.

9. The sand trap and flow controller mechanism as defined in claim 2 wherein said deflecting means further deflects water axially downwardly into said inner sand trap chamber.

10. The sand trap and flow controller mechanism as defined in claim 2 wherein said flow controller means includes a valve body having an axis substantially coincident to an axis of said inner peripheral wall, and said valve body is movable toward and away from said upper peripheral edge.

11. The sand trap and flow controller mechanism as defined in claim 2 including means for rotatably guiding the movement of said flow controller means toward and away from said upper peripheral edge, said rotatably guiding means includes a guide member and a guide follower, one of said guide member and guide follower being defined by said outer housing, and another of said guide member and guide follower being defined by said flow controller means.

12. The sand trap and flow controller mechanism as defined in claim 1 wherein said securing means is an external thread of said outer housing.

13. The sand trap and flow controller mechanism as defined in claim 1 including means for preventing relative rotation between said outer housing and said inner sand trap housing.

14. The sand trap and flow controller mechanism as defined in claim 1 wherein said outer housing includes an uppermost outwardly directed peripheral flange.

15. The sand trap and flow controller mechanism as defined in claim 1 wherein said outer housing including means for supporting said inner sand trap housing.

16. The sand trap and flow controller mechanism as defined in claim 1 including means for rotatably guiding the movement of said flow controller means toward and away from said upper peripheral edge.

17. The sand trap and flow controller mechanism as defined in claim 1 wherein said deflecting means further deflects water axially downwardly into said inner sand trap chamber.

18. The sand trap and flow controller mechanism as defined in claim 1 wherein said flow controller means includes a valve body having an axis substantially coincident to an axis of said inner peripheral wall, and said valve body is movable toward and away from said upper peripheral edge.

19. The sand trap and flow controller mechanism as defined in claim 1 wherein said flow controller means includes a valve body having an axis substantially coincident to an axis of said inner peripheral wall, and said valve body is movable toward and away from said upper peripheral edge upon rotation of said valve body relative to said inner sand trap housing.

20. The sand trap and flow controller mechanism as defined in claim 1 wherein said flow controller means carry said deflecting means.

21. The sand trap and flow controller mechanism as defined in claim 1 including means for rotatably guiding the movement of said flow controller means toward and away from said upper peripheral edge, said rotatably guiding means includes a guide member and a guide follower, one of said guide member and guide follower being defined by said outer housing, and another of said guide member and guide follower being defined by said flow controller means.

22. The sand trap and flow controller mechanism as defined in claim 1 including means for movably coupling said flow controller means to said inner sand trap housing outer peripheral wall for axial movement between water flow opening and closing positions.

23. The sand trap and flow controller mechanism as defined in claim 1 including means for movably coupling said flow controller means to said inner sand trap housing outer peripheral wall for rotational movement between water flow opening and closing positions.

24. The sand trap and flow controller mechanism as defined in claim 1 including means for movably coupling said flow controller means to said inner sand trap housing outer peripheral wall for axial and rotational movement between water flow opening and closing positions.

25. A bathtub comprising a bottom wall having an opening and internal threads associated therewith, a sand trap and flow controller mechanism including an outer housing defining an outer chamber, said outer housing having external threads threaded to said internal threads; an inner sand trap housing defined by an outer peripheral wall, an inner peripheral wall spaced from said outer peripheral wall and an annular bottom wall between said inner peripheral wall and said outer peripheral wall; said walls collectively defining an inner sand trap chamber, said inner peripheral wall having an upper peripheral edge and a lower water discharge opening, said inner sand trap housing being located in said outer chamber whereby water entrained sand is adapted to flow from an associated tub into said inner sand trap chamber, flow controller means for opening and closing water flow through said inner sand trap chamber over said upper peripheral edge whereby sand is retained in said inner sand trap chamber and water flows outwardly along said inner peripheral wall through said lower water discharge opening, and deflecting means for deflecting water flow radially outwardly beyond said upper peripheral edge.

26. The bathtub and sand trap and flow controller mechanism as defined in claim 25 wherein said flow controller means includes a valve body which seats upon said upper peripheral edge to prevent water flow through said lower water discharge opening.

27. The bathtub and sand trap and flow controller mechanism as defined in claim 26 including means for preventing relative rotation between said outer housing and said inner sand trap housing.

28. The bathtub and sand trap and flow controller mechanism as defined in claim 26 wherein said deflecting means further deflects water axially downwardly into said inner sand trap chamber.

29. The bathtub and sand trap and flow controller mechanism as defined in claim 26 wherein said flow controller means includes a valve body having an axis substantially coincident to an axis of said inner peripheral wall, and said valve body is movable toward and away from said upper peripheral edge.

30. The bathtub and sand trap and flow controller mechanism as defined in claim 26 including means for rotatably guiding the movement of said flow controller means toward and away from said upper peripheral edge, said rotatably guiding means includes a guide member and a guide follower, one of said guide member and guide follower being defined by said outer housing, and another of said guide member and guide follower being defined by said flow controller means.

31. The bathtub and sand trap and flow controller mechanism as defined in claim 25 including means for preventing relative rotation between said outer housing and said inner sand trap housing.

32. The bathtub and sand trap and flow controller mechanism as defined in claim 25 wherein said outer housing includes an uppermost outwardly directed peripheral flange in overlying relationship to said bottom wall opening.

33. The bathtub and sand trap and flow controller mechanism as defined in claim 32 wherein said outer housing including means for supporting said inner sand trap housing.

34. The bathtub and sand trap and flow controller mechanism as defined in claim 32 wherein said deflecting means further deflects water axially downwardly into said inner sand trap chamber.

35. The bathtub and sand trap and flow controller mechanism as defined in claim 32 wherein said flow controller means includes a valve body having an axis substantially coincident to an axis of said inner peripheral wall, and said valve body is movable toward and away from said upper peripheral edge.

36. The bathtub and sand trap and flow controller mechanism as defined in claim 32 including means for rotatably guiding the movement of said flow controller means toward and away from said upper peripheral edge, said rotatably guiding means includes a guide member and a guide follower, one of said guide member and guide follower being defined by said outer housing, and another of said guide member and guide follower being defined by said flow controller means.

37. The bathtub and sand trap and flow controller mechanism as defined in claim 25 wherein said outer housing including means for supporting said inner sand trap housing.

38. The bathtub and sand trap and flow controller mechanism as defined in claim 25 including means for rotatably guiding the movement of said flow controller means toward and away from said upper peripheral edge.

39. The bathtub and sand trap and flow controller mechanism as defined in claim 25 wherein said deflecting means further deflects water axially downwardly into said inner sand trap chamber.

40. The bathtub and sand trap and flow controller mechanism as defined in claim 25 wherein said flow controller means includes a valve body having an axis substantially coincident to an axis of said inner peripheral wall, and said valve body is movable toward and away from said upper peripheral edge.

41. The bathtub and sand trap and flow controller mechanism as defined in claim 25 wherein said flow controller means includes a valve body having an axis substantially coincident to an axis of said inner peripheral wall, and said valve body is movable toward and away from said upper peripheral edge upon rotation of said valve body relative to said inner sand trap housing.

42. The bathtub and sand trap and flow controller mechanism as defined in claim 25 wherein said flow controller means carry said deflecting means.

43. The bathtub and sand trap and flow controller mechanism as defined in claim 25 including means for rotatably guiding the movement of said flow controller means toward and away from said upper peripheral edge, said rotatably guiding means includes a guide member and a guide follower, one of said guide member and guide follower being defined by said outer housing, and another of said guide member and guide follower being defined by said flow controller means.

44. The bathtub and sand trap and flow controller mechanism as defined in claim 25 including means for movably coupling said flow controller means to said inner sand trap housing outer peripheral wall for axial movement between water flow opening and closing positions.

45. The bathtub and sand trap and flow controller mechanism as defined in claim 25 including means for movably coupling said flow controller means to said inner sand trap housing outer peripheral wall for rotational movement between water flow opening and closing positions.

46. The bathtub and sand trap and flow controller mechanism as defined in claim 25 including means for movably coupling said flow controller means to said inner sand trap housing outer peripheral wall for axial and rotational movement between water flow opening and closing positions.

* * * * *